United States Patent [19]

Dolansky et al.

[11] Patent Number: 4,617,602

[45] Date of Patent: Oct. 14, 1986

[54] PROTECTIVE PLUG FOR DISTRIBUTOR STRIPS

[75] Inventors: Franz Dolansky, Munich; Ewald Steiner, Berg, both of Fed. Rep. of Germany

[73] Assignee: Siemens Aktiengesellschaft, Berlin & Munich, Fed. Rep. of Germany

[21] Appl. No.: 719,330

[22] Filed: Apr. 3, 1985

[30] Foreign Application Priority Data

Apr. 3, 1984 [DE] Fed. Rep. of Germany ....... 3412452

[51] Int. Cl.[4] .............................................. H02H 9/06

[52] U.S. Cl. ................................ 361/119; 339/14 R; 339/147 R

[58] Field of Search ............. 339/14 R, 147 R, 198 N, 339/198 D; 361/119

[56] References Cited

U.S. PATENT DOCUMENTS 4,159,500 6/1979 Baumbach et al. ................. 361/119

4,345,294 8/1982 Forberg et al. ..................... 361/119

*Primary Examiner*—Eugene F. Desmond

*Attorney, Agent, or Firm*—Hill, Van Santen, Steadman & Simpson

[57] ABSTRACT

A protective element system includes a distributor strip and a protective element pluggable into the distributor strip. The distributor strip has a plurality of terminal posts for insulation stripping connection to electrical conductors. A plurality of upwardly open receptacle chambers are provided in an upper part of the distributor strip. In each chamber, a pair of contact springs are connected to respective terminal posts at outer sides of the respective receptacle chamber. A portion of a grounding rail projects into each of the receptacle chambers between respective contact springs in the associated chamber. The protective element includes a plug portion for insertion into a plurality of the receptacle chambers of the distributor strip. A plurality of upwardly open receptacle chambers are provided in the protective element for accommodating surge arresters. Contact springs are positioned opposite one another at outer portions of the receptacle chambers. A grounding rail projects into the receptacle chambers. The contact springs and grounding rail are connected via the plug portion to the respective contact springs and grounding rail of the respective plurality of receptacle chambers in the distributor strip in which the protective element is plugged.

4 Claims, 3 Drawing Figures

PROTECTIVE PLUG FOR DISTRIBUTOR STRIPS

RELATED APPLICATIONS

Attention is drawn to related applications, Ser. Nos. 719,342 and 719,331, copending herewith, and by the same inventors of the instant application.

BACKGROUND OF THE INVENTION

The invention relates to a protective plug for distributor strips comprising a plurality of double terminal posts which allow a non-stripped connection of electrical conductors. Upwardly open receptacle chambers of surge arresters are provided in the upper part thereof, and contact springs connected to the respective double terminal posts are positioned at the outsides of the receptacle chambers. Parts of a grounding rail project into the receptacle chambers between two contact springs lying respectively opposite one another.

Such distributor strips are usually designed for ten double leads and serve for the formation of jumpering restart points on the basis of the double terminal posts. Over and above this, they also permit a surge arrester to be allocated as needed to an arbitrary lead. When, however, the case arises that all twenty leads must be individually protected, then the removal, inspection, and re-insertion of the surge arresters at the site at which the distributor strips are provided causes a considerable expense, given regularly provided inspections of the functionability of the surge arresters.

SUMMARY OF THE INVENTION

An object of the invention is to provide an auxiliary device for such distributor strips which allows the inspection and the replacement of the protective devices within the distributor system without great expense in the case in which a protection is required for all leads at the distributor strip.

This object is achieved by a protective plug for distributor strips wherein the lower part of the protective plug is designed as a plug part insertable into the receptacle chambers of the distributor strip. Upwardly open receptacle chambers for surge arresters are provided in the upper part of the protective plug. Contact springs are disposed at the outsides of these upwardly open receptacle chambers. Parts of a grounding rail project into the receptacle chambers between two contact springs respectively lying opposite one another. The contact springs and the grounding rail are connected via the plug part to the corresponding contact springs and the grounding rail of the distributor strip.

The surge arresters in the invention are no longer directly inserted into the distributor strip, but are combined in a pluggable protective plug. All surge arresters can be respectively pulled with a single manipulation and new surge arresters can be inserted with another single manipulation. The inspection and replacement of defective surge arresters, therefore, no longer need occur in place, but can be carried out in the workshop independent of time.

Since an overcurrent protection for all leads is also frequently required in addition to an overvoltage protection, a further development of the protective plug of the invention is that the contact spring parts projecting into the receptacle chambers are designed in right-angle fashion such that the free leg is respectively situated proximate to the floor, whereby its outer edge is pressed against the grounding rail. The length of the free leg is dimensioned such that, after insertion of a surge arrester and of a solder ring, the distance between its outer edge and the grounding rail is less than the thickness of the solder ring. Simultaneously achieved by means of this design is that, due to the fashioning of the contact springs according to the invention, the contact springs connected to the leads connect the leads to the grounding rail after the solder ring has melted, and thus short them.

DESCRIPTION OF THE PREFERRED EMBODIMENTS

Figure 1:
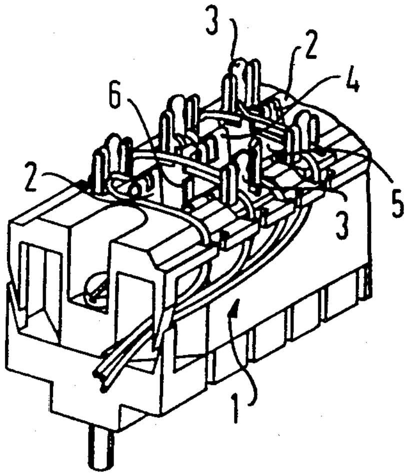
FIG. 1 is a perspective partial view of a distributor strip wherein the protective plug of the invention is to be employed.

FIG. 1 shows a perspective partial view of a distributor strip for the protective plug of the invention. In its upper part, the illustrated distributor strip 1 comprises receptacle chambers 2 for the acceptance of surge arresters. Situated at the upper long sides of the distributor strip 1 are a plurality of double terminal posts 3 which are connected to contact springs 4 projecting in at the neighboring side walls of the receptacle chambers 2. The individual receptacle chambers 2 are separated from one another by partitions 5.

Figure 2:
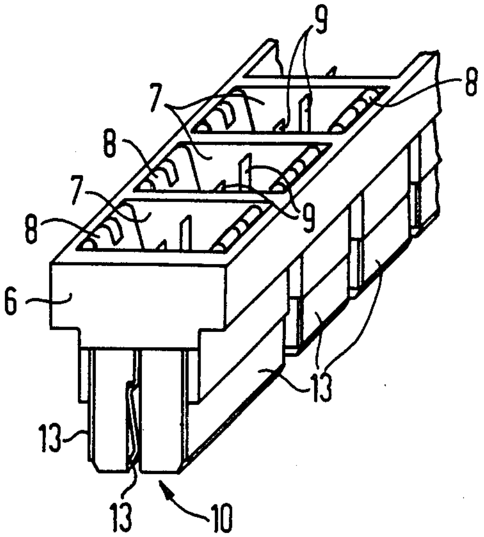
FIG. 2 is a perspective partial view of a protective plug of the invention.
Figure 3:
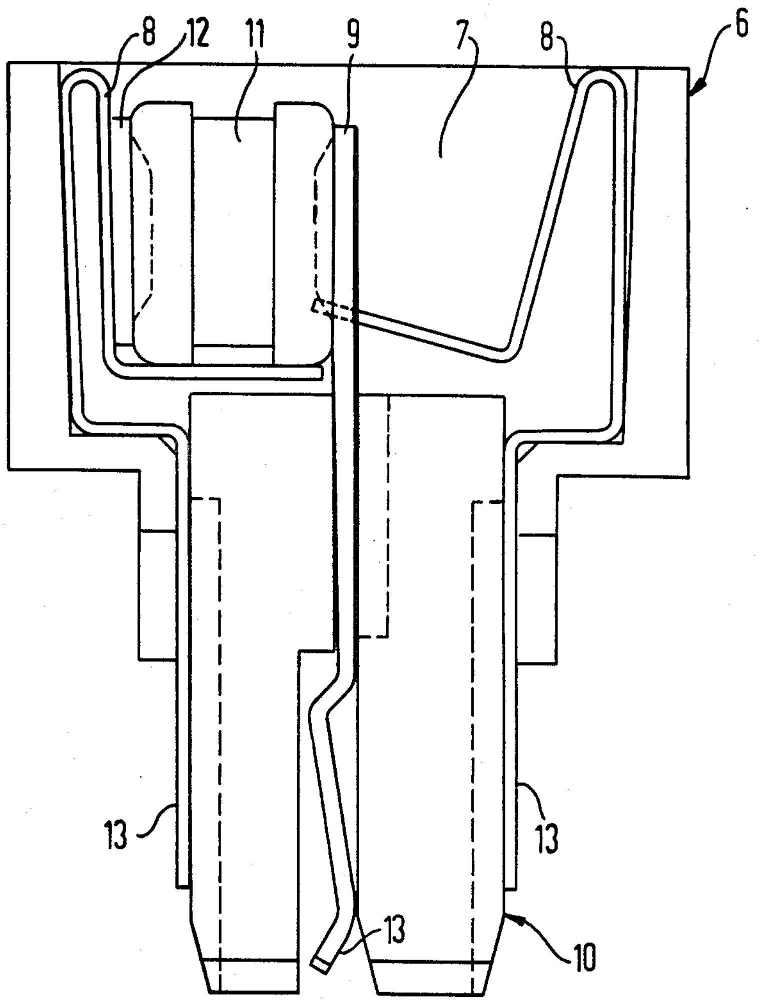
FIG. 3 is a section through a protective plug of the invention.

FIGS. 2 and 3 show an exemplary embodiment of the protective plug 6 of the invention. The protective plug 6 is essentially composed of the lower plug part 10 and an upper part comprising the receptacle chambers 7 for surge arresters. The plug part 10 of the protective plug 6 is fashioned such that it is insertable into the receptacle chambers 2 of the distributor strip shown in FIG. 1 and has the contacts 13 of the plug part 10 contacting both the contact springs 4 as well as the grounding rail present in the distributor strip. The receptacle chambers 7 of the protective plug 6 essentially correspond to the receptacle chambers 2 of the distributor strip. Two surge arresters are respectively insertable into each of the receptacle chambers 7 between one of the contact springs 8 and the grounding rail 9. The contact springs 8 and the grounding rail 9 of the receptacle chambers 7 are connected via contacts 13 of the plug part 10 to the corresponding contact springs and the grounding rail of the distributor strip 1.

Since the surge arresters are not directly inserted into the distributor strip, but are combined in the protective plug 6 of the invention, a single manipulation respectively suffices in order to remove all surge arresters or to provide the distributor strip 1 with new surge arresters.

As a consequence of the right-angled design of the contact springs 8 projecting into the receptacle chambers 7, an additional protection against overcurrents can be achieved in conjunction with a solder ring 12. As results from FIG. 3, after insertion of a surge arrester 11 and of a solder ring 12 into one half of a receptacle chamber, the free leg of the contact part of the contact spring 8 is forced away from the grounding rail, so that there is no connection between the contact spring 8 and the grounding rail 9 in the normal case. When, however, an overcurrent occurs on a lead, then the corresponding solder ring 12 melts. The result is that the contact spring 8 under bias has its outer edge pressed against the grounding rail 9, and thus applies the lead respectively connected to the contact spring 8 to ground potential.

Although various minor changes and modifications might be proposed by those skilled in the art, it will be understood that we wish to include within the claims of the patent warranted hereon all such changes and modifications as reasonably come within our contribution to the art.

We claim as our invention:

1. A protective element system, comprising:

a distributor strip having a plurality of double terminal post means for connection of electrical conductors arranged in two rows;

upwardly open receptacle chamber means between the two rows in an upper portion of the distributor strip;

contact springs connected to the respective double terminal post means at outer sides of the receptacle chamber means; and portions of a grounding rail projecting into the receptacle chamber means between the contact springs opposite one another in the chamber means;

a protective element having a lower part designed as a plug means for insertion into the receptacle chamber means of the distributor strips;

an upwardly open receptacle chamber means provided in the protective element for accommodating surge arresters at an upper part thereof;

one-piece contact springs each having first portions opposite one another at sides of the receptacle chamber means and second portions extending to the plug means, and a one-piece grounding rail having a first portion projecting into the receptacle chamber means between the contact springs and a second portion projecting into the plug means;

the second portion of each of the contact springs and the second portion of the grounding rail directly abutting the contact springs and the grounding rail respectively of the receptacle chamber means of the distributor strip in which the protective element is plugged; and the first portion of each of the contact springs in the receptacle chamber means of the protective element having an integral free leg portion bent at approximately a right-angle with respect to remaining portions of the contact spring and situated adjacent a floor of the chamber means, a leading edge of the free leg being pressed in spring-like fashion against the grounding rail when a surge arrester is not present, and a length of the free leg being dimensioned such that after insertion of a surge arrester with an associated solder spacer, a spacing between said leading edge and the grounding rail is smaller than a thickness of the solder spacer.

2. A protective element system, comprising:

a distributor strip including a plurality of terminal post means for insulation stripping connection to electrical conductors;

a plurality of upwardly open receptacle chamber means in an upper portion of the distributor strip;

in each chamber means a pair of contact springs being connected to respective terminal post means outwardly of the respective receptacle chamber means;

a grounding rail projecting into each of the receptacle chamber means between respective contact springs in the associated chamber means;

a protective element including a plug means at a lower portion of the protective element for insertion into at least one of the receptacle chamber means of the distributor strip;

at least one upwardly open receptacle chamber means in the protective element for accommodating a pair of surge arresters;

one-piece first and second contact springs having first portions opposite one another at outer portions of the receptacle chamber means and second portions extending so that they are positioned at outer portions of the plug means;

a one-piece grounding rail having a first portion projecting into the receptacle chamber means between the two contact springs and a second portion projecting into a slotted portion of the plug means;

the one-piece grounding rail being positioned and shaped such that one surface of the first portion thereof can contact a first surge arrester between the grounding rail and the first contact spring first portion and an opposite surface of the first portion thereof can contact a second surge arrester between the ground rail and the second contact spring first portion; and the contact springs second portions and the grounding rail second portion being in direct abutting contact via the plug means to the respective contact springs and grounding rail of the respective receptacle chamber means in the distributor strip in which the protective element is plugged, the distributor strip grounding rail being received in the slotted portion of the plug means.

3. The system of claim 2 wherein the first and second contact spring first portions also include an integral free leg portion bent at approximately a right angle with respect to remaining portions of the contact spring, a leading edge of the free leg portion being pressed in spring-like fashion against the grounding rail when a surge arrester is not present.

4. A system according to claim 3 wherein a length of the free leg portion is dimensioned such that after insertion of a surge arrester with an associated solder spacer, a spacing between said leading edge and the grounding rail is smaller than a thickness of the center spacer.

* * * * *